(No Model.) 3 Sheets—Sheet 1.

D. ARÁMBURN.
APPARATUS FOR RECORDING DISTANCES, GRADIENTS, AND ANGLES.

No. 536,906. Patented Apr. 2, 1895.

Witnesses:
Jno H Blackwood
H. P. Doolittle.

Inventor.
Domingo Arámburu
by Wm H Doolittle
Attorney.

(No Model.) 3 Sheets—Sheet 2.

D. ARÁMBURN.
APPARATUS FOR RECORDING DISTANCES, GRADIENTS, AND ANGLES.

No. 536,906. Patented Apr. 2, 1895.

Witnesses: Inventor,
Jos H Blackwood Domingo Aramburn
H. P. Doolittle. by Wm H Doolittle
Attorney.

(No Model.) 3 Sheets—Sheet 3.

D. ARÁMBURN.
APPARATUS FOR RECORDING DISTANCES, GRADIENTS, AND ANGLES.
No. 536,906. Patented Apr. 2, 1895.

Witnesses:
Jos. H. Blackwood
H. P. Doolittle

Inventor.
Domingo Arámburn
by Wm. P. Doolittle
Attorney

UNITED STATES PATENT OFFICE

DOMINGO ARÁMBURN, OF MEXICO, MEXICO.

APPARATUS FOR RECORDING DISTANCES, GRADIENTS, AND ANGLES.

SPECIFICATION forming part of Letters Patent No. 536,906, dated April 2, 1895.

Application filed August 29, 1894. Serial No. 521,619. (No model.)

*To all whom it may concern:*

Be it known that I, DOMINGO ARÁMBURN, a citizen of Mexico, residing at Mexico, in the Republic of Mexico, have invented certain new and useful Improvements in Apparatus for Recording Distances, Gradients, and Angles; and I do hereby declare the following to be a full, clear, and exact description of the invention, such as will enable others skilled in the art to which it appertains to make and use the same, reference being had to the accompanying drawings, and to the letters and numerals of reference marked thereon, which form a part of this specification.

My invention relates to apparatus for recording distances, gradients and angles, and consists of an instrument not only for measuring distances but for automatically plotting, as well as for grading and leveling and recording these data.

The apparatus is mounted on wheels and adapted to be used on any ground over which wheels can be moved. Its size, construction and power of resistance can be varied according to the nature of the ground on which it is to be employed.

My invention is illustrated in the accompanying drawings, in which—

Figure 1:
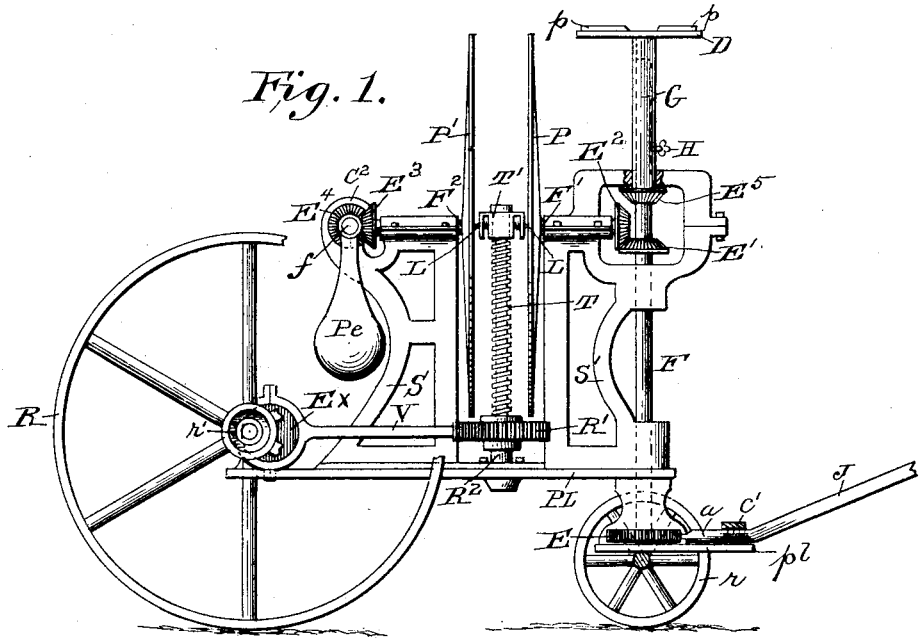
Figure 2:
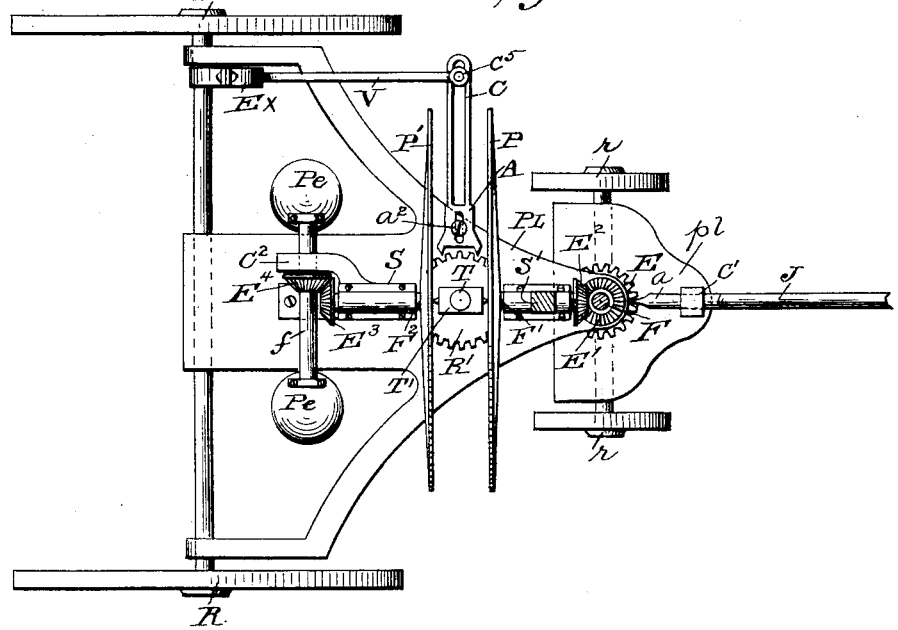
Figure 3:
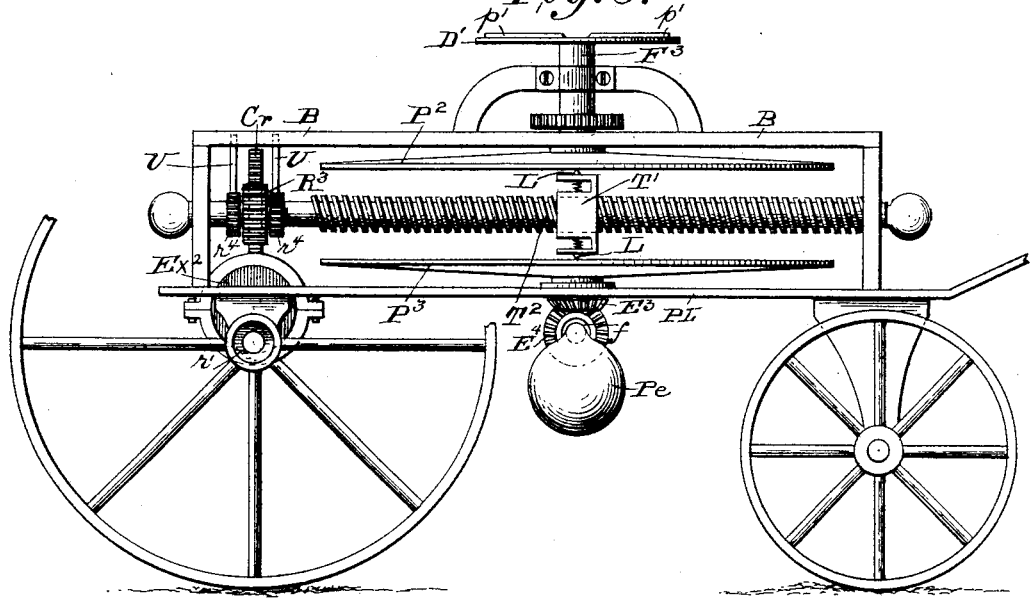
Figure 5:
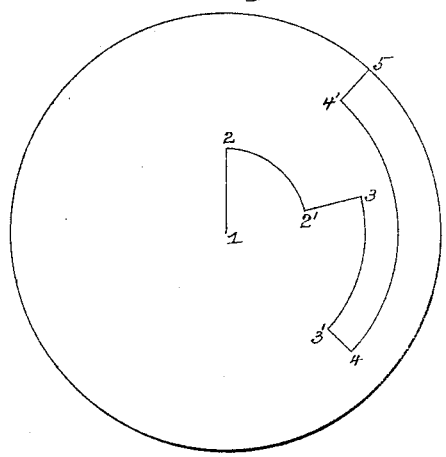
Figure 6:
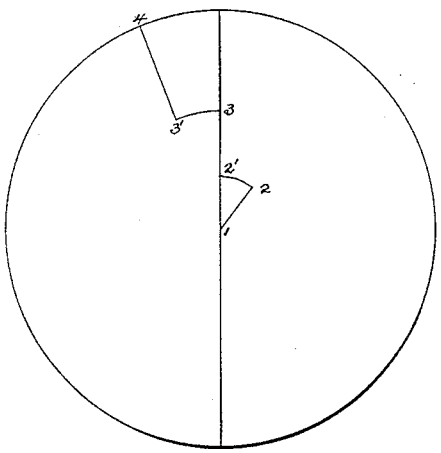

Figure 1 is a side view in elevation; Fig. 2, a plan partly in section; Fig. 3, a side view in elevation of a modification, and Fig. 4, a plan of such modification; Figs. 5 and 6, diagrams to illustrate the mode of inscribing the distances, angles, gradings, and levels on recording plates, by the apparatus, and Figs. 7, 8, and 9, details of the eccentric operating device in the modification.

Referring to the drawings, the apparatus is composed of a platform, PL, resting on the shafts of four wheels. The front wheels are designated by the letter, $r$, and the two rear wheels by R. The circumference of each of these rear wheels must be exact and specific, for example, of one, two, or three meters. The front wheels may be of any diameter desired, but care must be taken that they do not come in contact with the platform.

S, S' are vertical supports situated on the center line of the platform.

Resting on a smaller platform, $pl$, which is supported on a sleeve over the shaft of the front wheels, is a cog wheel, E, which at its center is fixed on a vertical shaft, F. On the smaller platform, $pl$, is also placed a pointer, $a$, forming a part of the tongue, J, to which it is connected by a screw joint, $c'$, and is adapted to engage with the wheel, E.

E' is a miter wheel, fixed on the upper part of the shaft, F, and in engagement with the beveled cog wheel, $E^2$, carried at the end of a horizontal shaft, F', which has its opposite end fitted into a circular plate or disk, P. The upright shaft, F is fixed in the support, S', by means of suitable bearings, and carries a sleeve, G, which bears at its top, a plate, D, and sights, $p$. This sleeve is adapted to be moved on shaft, F, and to be secured by thumb-screw, H.

$Ex$ is an eccentric fixed on the axle of the hind wheels, and which by means of a connecting rod, V, communicates an oscillating movement to the rocker shaft, $c$, which carries on its inner end a double pawl, A, which engages with a cog wheel, R'. The shaft, $c$, is supported on set screw, $a^2$, which passes into the support, S.

$F^2$ is a horizontal shaft fitting into bearings on the support, S, and carrying at its front end a circular plate or disk, P'. A miter wheel, $E^3$, is fixed on the opposite end of this shaft near to the rear wheels, R, and engages with a beveled cog wheel, $E^4$, on a shaft, $f$, placed at right angles to shaft, $F^2$, and supported in bearing, $c^2$, on support, S. A weight, $Pe$, is fixed on each end of this shaft, $f$, for the purpose of controlling the movement of said shaft.

T is a vertical screw which extends through the center of the cog wheel, R', into socket piece, $R^2$. This socket piece is fixed rigidly in position on the center of the platform, and its center exactly divides the space between the plates, P and P'. A nut, T', works along the entire length of the screw, T, and carries the styles or pencils, L, which impinge on the surfaces of the plates, P, P'. The impressions will be received on two zinc plates properly prepared and having the same diameter as the plates, P, P', to which they are secured by means of springs, screws, &c.

The entire apparatus, excepting the wheels, may be covered with a box made of any suitable material to preserve the apparatus from injury by the weather.

An aneroid barometer, a thermometer, a clock, and a compass are attached to this apparatus. All these pieces or attachments may be placed wherever the constructer of the machine deems most convenient.

The apparatus as thus far described may be considered as divided into two parts, viz: the instrument, which registers the data of the polygon which it is proposed to survey, and the automatic registering level, which shows the data with respect to changes of level.

The operation of the apparatus is as follows: When the apparatus is moved forward by means of the tongue, J, the pointer, $a$, is out of contact with the toothed wheel, E. The eccentric E$x$ communicates its movement to the rocker shaft, $c$, by means of the connecting rod, V, and which movement rocks the pawl, A, engaging with the toothed wheel, R'. This movement turns the screw, T, by which the nut, T', is drawn along the length of the screw. As the styles, L, carried by the nut, T', press upon the plates, P P', the nut is prevented by such pressure from rotating but at the same time is carried up and down on screw, T, by the rotation of that screw. Either of the teeth of the pawl, A, may be made to so engage with the toothed wheel, as may be desired, to produce a rotary movement from right to left, or vice versa. The pawl may be set in or out of contact with the cog wheel, R', by means of the set screw, $a^2$. Let it be supposed that it is desired to make a survey of any polygon. The styles L are placed at the center of the plates, P, P'. As the apparatus advances, the nut, T', descends the screw, T, and the style marks on the plate, P, a straight line, which is in proportion to the distance run, according to the diameter of the hind wheels, which line is marked as shown in Fig. 5 by the numbers, 1 and 2. On arriving at number 2, which is the termination of the first line of the polygon to be constructed, it is necessary to place the apparatus in such a position that its line of center will exactly coincide with the line which has been run, which is done by means of the sights, $p$, on plate, D, carried by the sleeve G of the vertical shaft, F. When placed in this position, the tongue J, will be turned on its axis which will cause the screw, $c'$, to push forward the pointer, $a$, until it engages with the toothed wheel, E. When this is done, the tongue of the apparatus will be turned around until it coincides with the new line of the polygon which the apparatus is to delineate. In this rotary movement, the pointer, $a$, which is engaged with the toothed wheel, E, obliges this wheel to turn, communicating its movement to the shaft, F, thence to the miter wheel, E', thence to the cog wheel, $E^2$, thence to the shaft, F', and finally to the plate, P. An arc of a circle is thus described on the plate, the degrees of which are equal to those of the angle between the first line and the one which is to be measured, and the radius of whose circle will be equal to the length of the first of these two lines. This arc of a circle is shown in Fig. 5 by the numbers, 2 2'. When this is done it is only necessary to turn the tongue in a direction opposite to the previous direction, to draw back the pointer from the cog wheel, bring the tongue back to its former position, and to leave the plate, P, in the position which was given to it on taking the angle, 2 2'. The whole apparatus is now drawn along the second side of the polygon which is being surveyed, and the nut, T', continues its work of recording a straight line. This line is shown by the numbers, 2' 3. Continuing the method above described, there will be inscribed on the plate lines composed of tangents and curves, as indicated in Fig. 5. From this line a polygon, corresponding to the polygonal figure which has been surveyed, may be constructed. In order that the angles should be measured with the greatest exactitude, the miter wheel, $E^5$, on sleeve G of shaft, F, is provided, which may be lowered to engaged with cog wheel, $E^2$, on horizontal shaft, F', and the exact angle obtained by aid of the sights, $p$, on disk, D.

From the above explanation, it will be understood that if necessary, the use of the pointer, $a$, the cog wheel, E, and the miter wheel, $E^5$, might be dispensed with, and the angles taken directly with the sights on the disk, D, it being noticed that after the measurement of the angle, this disk can be returned to its original position without producing any effect on the shaft and on the cog wheels which move the plate.

The plate which receives the impressions that record the change of level and which is placed on the plate, P', has a cross line already marked on it, and it is placed on the plate in such a manner that the said center line occupies a vertical position as shown in Fig. 6.

When the inclination of the ground changes, the four wheels take the new plane of the surface, the weights take a vertical position by the action of gravity, and the force which they produce in this movement is communicated to the shaft, $f$, the cog wheel, $E^4$, the miter wheel, $E^3$, the shaft, $F^2$, and the plate, P', which latter is thus turned on its center, the distance of an arc of a circle equal in degrees to the inclination of the ground, bearing in mind the fact that the weights hang in a position perpendicular to the horizontal plane and the screw T is perpendicular to the surface of the same ground. The center line which has now been deviated from by the inclination of the apparatus, forms an angle, showing that inclination by the line which is traced by the style as the apparatus advances. Each new slope that is passed over will be successively shown in the quadrant, the marking of the style showing whether it is an ascent or descent.

The above can be better understood by reference to Fig. 6, in which the first slope is shown by numbers 1 and 2. The curve between the first and second slopes is shown by numbers 2 2'. The second slope is shown by numbers 2' 3, the second curve by 3 3', and so on.

Figure 4:
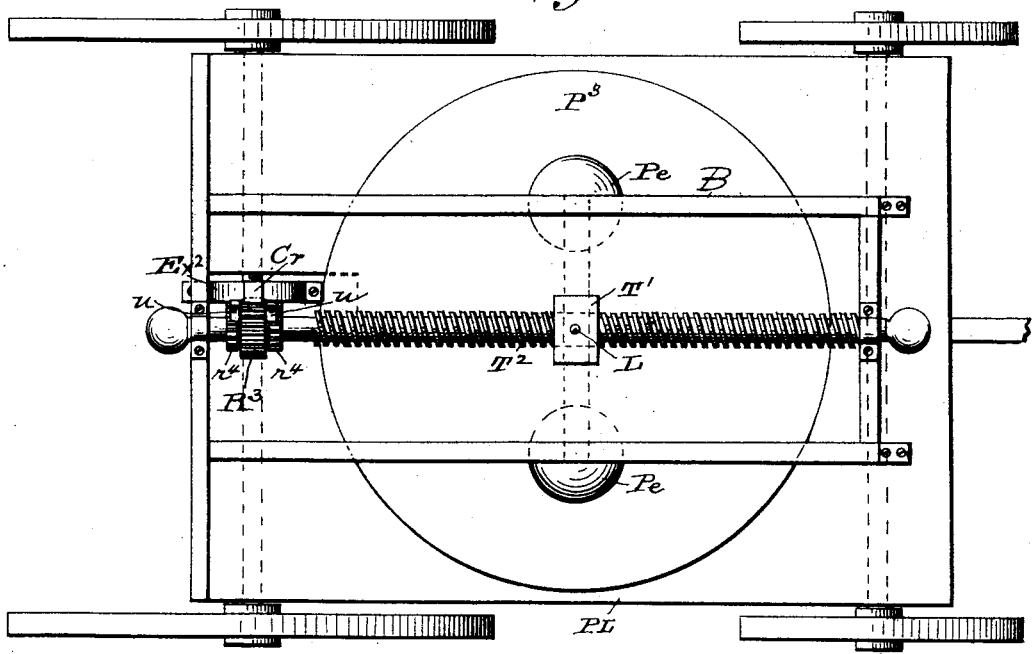
Figure 7:
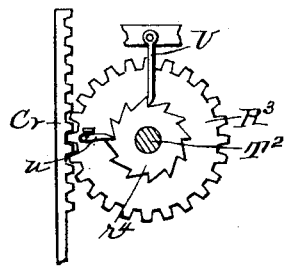
Figure 8:
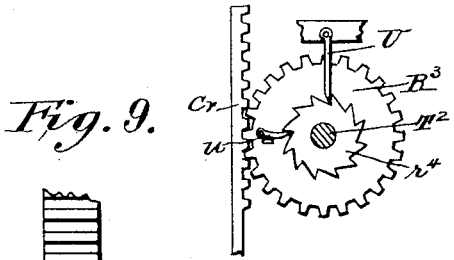
Figure 9:
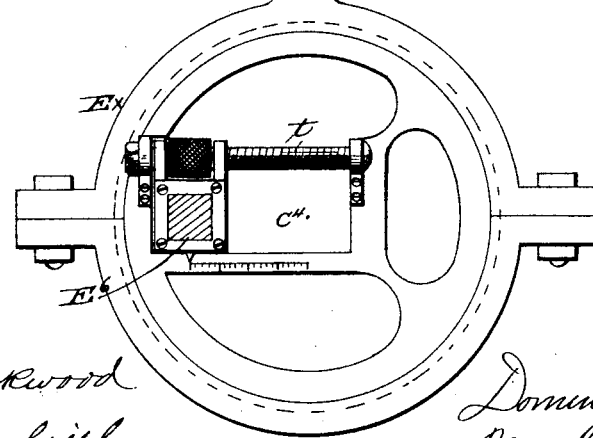

In Figs. 3 and 4 a modification of the apparatus is shown in which the recording plates of the apparatus are placed in a horizontal position, and P² and P³ are the plates which correspond to the plates P and P' of the upright instrument. They are placed within a frame, B, B, which is secured to the platform, PL. To the center of the upper plate, P², and rising at right angles to the same, is the shaft, F³, carrying the sight plate, D', and the sights, $p'$, at its upper end and which when rotated turn the plate, P². The screw, T², which is also placed in a horizontal position, passes between the two plates, P² P³, and receives its rotary motion from the eccentric, Ex², situated at the rear and center of the platform and at right angles to the said screw. This eccentric, instead of having a connecting rod, has a rack bar, Cr, which is adapted to engage with the cog wheel, R³, carried on the screw, T². The details of this eccentric are shown in Figs. 7, 8, and 9. As shown in Fig. 9 the eccentric is placed on the axle of the motor wheels at the point, E⁶. A screw, $t$, engaging with the axle, in turning compels this axle to approach, more or less the point, $c^4$, which is the center of the eccentric. The scale which is shown in the same figure is that which denotes the extent of the eccentric motion that may be regulated by the screw, $t$.

Figs. 7 and 8 are vertical sections, showing the position of the rack bar, Cr, with respect to the cog wheel, R³, and smaller cog wheels, $r^4$.

When the movement of the rack bar is caused by means of the eccentric, it engages the cog wheel, R³, to an extent according to the degree of the eccentric motion. The cog wheel, R³, has a free rotary movement on the screw T², and in receiving such movement by means of the rack bar, the tappets, $uu$, respectively engage with one or other of the cog wheels, $r^4$, which are fixed on the screw, T², and communicate their own movement to it. On producing a rotary movement of the cog wheel, R³, a tappet, $u$, produces at the same time, a similar movement of the cog wheel, $r^4$, and a detent, U, engages the same number of teeth which have been turned. When the rack bar makes its return movement, it carries with it the cog wheel, R³, and the tappet, $u$, slips in the teeth of the wheel, $r^4$, which is prevented from turning back by the detent, U.

From the above statement it will be seen that whether one or other of the wheels, $r^4$, receives its motion by means of the tappets, $u$, (which can be placed as desired,) the screw receives a rotary motion on its own axis, from right to left or vice versa, and that the greater or less degree of eccentric motion, obliges the nut, T', to run the whole length of the screw, more or less; this point being determined by the scale on which it is desired to work. In order to work with different scales with the eccentric shown on Fig. 1, it is only necessary to transfer that eccentric to the slot, $r'$, on the axle, which eccentric carries the connecting rod, V. The end of the latter which is fixed in the rocker pawl, $c$, is secured by means of the button, $c^5$. The nearer the eccentric is placed to the center line of the apparatus, the greater will be the number of teeth with which the pawl, $c$, engages on the cog wheel.

Whatever may be the form of the instrument, it may be provided with different eccentrics of different diameters, as well as several screws of different speeds. With a proper supply of these, drawings can be obtained of all the scales that may be required.

In order to make the profile with a smaller vertical scale than the horizontal, it is only necessary to change the diameter of the miter wheels in such a way that the one which corresponds to the weights should be greater in diameter than the one which carries the shaft of the plate. The relation between the diameter of these miter wheels can be as one to two, one to three, &c.

In order to construct the polygon with the data shown in Fig. 5, it will be required to draw from the point 2, a line parallel to the line 2' 3 and of the same length, and from the end of that line, to draw another parallel to 3' 4, &c.

In order to construct the profile with the data shown in Fig. 6, it is required to draw parallel lines in the way described in the previous paragraph.

In the case of the modification, the movements of the automatic registering level are the same as those explained with reference to the apparatus in Figs. 1 and 2, with the exception, that as the screw is in a horizontal position, it is parallel to the surface of the ground, while the weights are perpendicular to the horizontal plane. The data thus obtained are also the same as that shown in Fig. 6.

Provision may be so made in both forms of the apparatus, that when the style has reached the end of the plate or the paper thereon, an electric circuit is closed, which rings a bell, and notifies the operator of the necessity of changing the paper, as well as that of changing the rotary motion of the screw, whether by means of one of the teeth of the pawl, $a$, in Fig. 1, or by means of one of the tappets shown in Figs. 7 and 8.

The marking points can be either lead pencils, slate pencils, stylographs, steel points, or any thing else of that class, according to whether the leaf employed is of common paper, slate paper, &c. When a steel point is used it can be combined with zinc plates, tin plates or any other material, with a coating of common varnish, or of other material which will bear scratching and will show the impression.

The weights, Pe, which give the inclination of the ground, sometimes oscillate with the motion of the instrument, or when the latter meets any obstacle. This oscillation is communicated to the plate and consequently is impressed on the leaf, by small segments of a circle, according to the violence of the oscillation. In order to obtain in these cases, the line which really shows the slope of the ground, it is only necessary to take the mean line of the oscillations. These oscillations will also be in proportion to the velocity with which the instrument is drawn. In case the oscillations are very violent through the roughness of the ground, it will be found convenient to do the work on a small scale, so as to get more exactness in the results.

The differences of level in the apparatus having vertical plates is equal to the sine of the angle which the slope forms with the center line, and in the apparatus with horizontal plates, it is equal to the sine of the complementary angle which is thus formed.

Having thus described my invention, what I claim is—

1. In a recording apparatus mounted upon wheels, the combination with suitable supports, of two recording disks or plates, a separate independent shaft for each of said disks or plates, having bearings in said supports, a screw placed between said disks or plates, a nut adapted to move on said screw provided with opposite styles to record lines on the opposite disks, and an eccentric and cog wheel mechanism connecting the axle of one set of wheels and the said screw, whereby the nut carrying the styles is carried to and fro on said screw to record lines on the said plates, substantially as described.

2. In a recording apparatus mounted on wheels, the combination with the axle of the hind wheels, of an eccentric connected to and actuated by said axle, a screw shaft provided with a cog wheel, said eccentric provided with an arm engaging said cog, said screw provided with a traveling nut having a stylus, and a plate or disk against which said stylus is pressed to receive a straight line marked upon the plate by said stylus, substantially as described.

3. In a recording instrument mounted on wheels the combination with a suitable support of a shaft mounted thereon, said shaft provided at one end with a recording plate and at its opposite end with a cog wheel, a second shaft mounted at right angles to the former shaft and provided centrally with a cog wheel engaging the wheel on the former mentioned shaft, weights suspended from the opposite ends of the second shaft, a stylus and its support in front of said plate, whereby when the apparatus is moved off a level surface, the shaft carrying the weights is turned, actuating the plate carrying shaft, and the leveling data is recorded on said plate, substantially as described.

4. In a recording apparatus mounted on wheels, the combination with the axle of the front wheels, of a platform mounted thereon, a pointer on said platform, a pivoted tongue adapted to connect with said pointer, a vertical shaft provided at its lower end with a cog wheel adapted to engage with said pointer, a cog wheel on the upper portion of said shaft, a recording plate, a shaft carrying and rotating said plate, and provided at its opposite end with a cog wheel to engage the cog on said vertical shaft, and a stylus mounted in front of said plate, whereby when the direction of the tongue is changed, the corresponding angle will be marked on said plate, substantially as described.

In testimony whereof I affix my signature in presence of two witnesses.

DOMINGO ARÁMBURN.

Witnesses:
JULIAN SCIRRO,
FEDERICO RAMEREZ.